(12) United States Patent
McIntyre et al.

(10) Patent No.: US 7,212,304 B2
(45) Date of Patent: May 1, 2007

(54) SENDING/RECEIVING RASTER/IMAGE DATA USING A MULTIFUNCTION PRODUCT

(75) Inventors: Lloyd McIntyre, Cupertino, CA (US); Kush N. Lakdawala, Fairport, NY (US); Joseph R. Calabrette, Corinth, TX (US); Yiin-shiau Jenny Chen, Alameda, CA (US)

(73) Assignee: Xerox Corporation, Stamford, CT (US)

( * ) Notice: Subject to any disclaimer, the term of this patent is extended or adjusted under 35 U.S.C. 154(b) by 1068 days.

(21) Appl. No.: 10/358,816

(22) Filed: Feb. 5, 2003

(65) Prior Publication Data

US 2004/0150852 A1 Aug. 5, 2004

(51) Int. Cl.
*G06F 3/12* (2006.01)
*G06F 15/00* (2006.01)

(52) U.S. Cl. .................................... 358/1.15; 358/1.13
(58) Field of Classification Search ................ 358/1.9, 358/1.1, 1.15, 1.13, 1.6, 1.18, 530, 539, 403, 358/405, 426.02, 426.09, 440
See application file for complete search history.

(56) References Cited

U.S. PATENT DOCUMENTS 6,028,679 A * 2/2000 Murphy ...................... 358/407

| 2002/0120670 | A1 | 8/2002 | Chou | 709/201 |
| 2002/0140960 | A1 | 10/2002 | Ishikawa | 358/1.13 |
| 2003/0164989 | A1* | 9/2003 | Yajima | |
| 2005/0012965 | A1* | 1/2005 | Bloomfield | |
| 2007/0046981 | * | 3/2007 | Sekiguchi | |

FOREIGN PATENT DOCUMENTS

EP 1091557 A2 6/2002

\* cited by examiner

*Primary Examiner*—Douglas Q. Tran
(74) *Attorney, Agent, or Firm*—Perman & Green, LLP

(57) ABSTRACT

A method and system for transferring raster/image data via a mail user agent using a multifunction device and standard Internet mail transfer mechanisms. An image is acquired in the multifunction device, the image is attached to an electronic mail message, and then sent in the electronic mail message to receiving address(es). Alternatively, an electronic mail box is polled by a mail user agent, which identifies those received messages with raster/image attachment(s) and downloads the attachment(s) to the multifunction device for printing, displaying and/or workflow insertion.

16 Claims, 3 Drawing Sheets

SENDING/RECEIVING RASTER/IMAGE DATA USING A MULTIFUNCTION PRODUCT

BACKGROUND OF THE INVENTION

1. Field of the Invention

The features of the disclosed embodiments relate generally to transferring raster/image data, and in particular to transferring raster/image data via Internet mail transfer mechanism.

2. Brief Description of Related Developments

Multifunction devices (MFD) have become one of the most common raster/image capture sources. Transfer of MFD captured raster/image typically takes the form of fax transmissions. It is well accepted that transfer via Internet mail transfer mechanism (i.e. email) would be more cost effective and would contribute to an increase in the transferred quality level. Cost inelasticity associated with the commodity based MFD industry, however, makes it difficult to absorb the cost associated with adding mail user agent (MUA) and mail server functionality to the MFD. This invention overcomes the cost issues by taking advantage of MUAs and mail servers that reside in computers and other devices.

SUMMARY OF THE DISCLOSED EMBODIMENTS

The disclosed embodiments are directed to transferring raster/image data via a mail user agent using a multifunction device. In one embodiment, the method comprises acquiring an image in the multifunction device, attaching the image to an electronic mail (email) message, and sending the image in the electronic mail message to a receiving address. In one aspect, the disclosed embodiments are directed to a method of sending and receiving an IFAX (Internet Fax or Facsimile). In one embodiment, the method comprises selecting an IFAX destination address on a multifunction device, acquiring an image in the multifunction device, and sending the IFAX including the image to an IFAX or email destination.

In another aspect, the disclosed embodiments are directed to transferring raster/image data via standard Internet mail transfer mechanisms by using a multifunction device coupled with an email application. In one embodiment, the method comprises automatically launching a mail user application or mail user agent (MUA), transferring the receiving clients destination information from the multifunction device to the mail user agent, transferring raster data from the multifunction device to the mail user agent, preparing an email message with the raster data attached for submission to the Internet and submitting the email message for transmission by an appropriate mail server.

In a further aspect the disclosed embodiments are directed to a system for transferring raster/image data. In one embodiment the system comprises a multifunction device coupled with a mail user agent, an image input device allowing images to be inputted to the multifunction device.

When the mail user agent is launched, a receiving client destination is transferred from the multifunction device to the mail user agent and the raster/image data received from the input device is transferred from the multifunction device to the mail user agent, and the mail user agent transmits an email message including the raster/image data.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
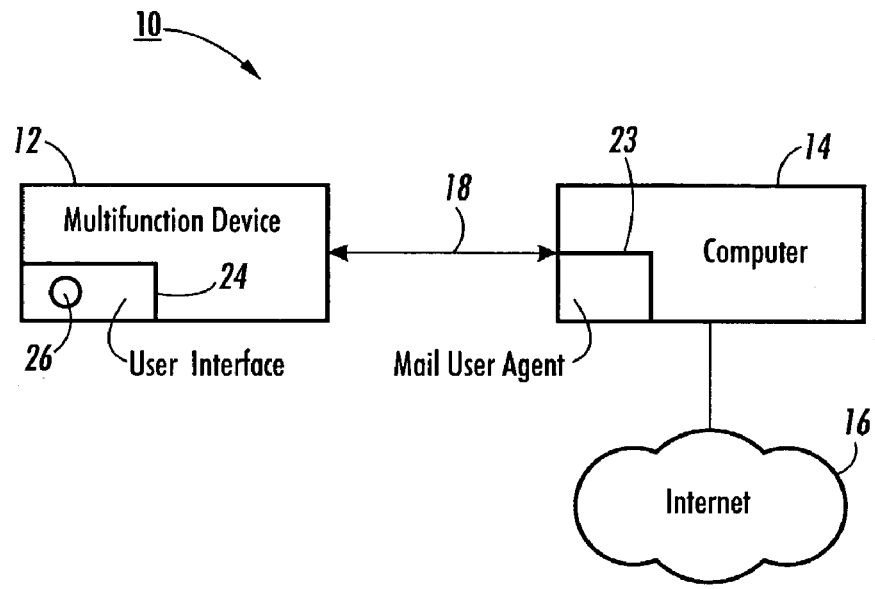
FIG. 1 is a block diagram of a system incorporating features of the disclosed embodiments.

As shown in FIG. 1, the system 10 generally comprises a multifunction device 12 coupled with a mail user agent 23 that resides on a computer 14, such as for example, a personal computer. The mail user agent 23 generally comprises an electronic mail application ("email").

Figure 2:
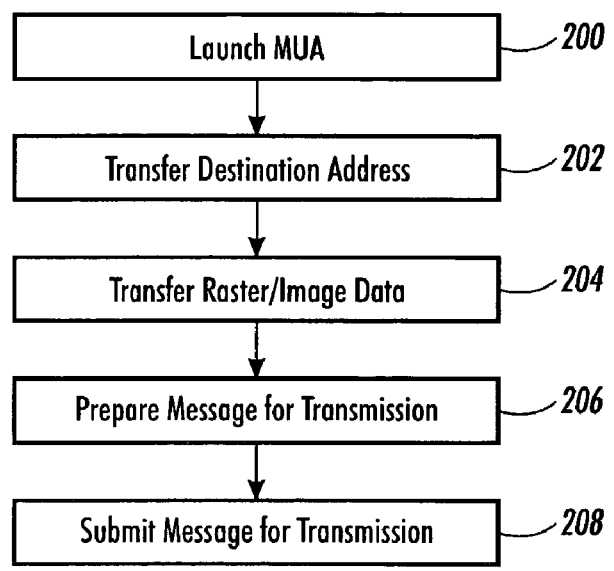
FIG. 2 is a flow chart of one embodiment of a method incorporating features of the disclosed embodiments.

Although the mail user agent 23 is described as being resident on a computer, the mail user agent can reside on any suitable device that is directly or network connected to the multifunction device 12 and has access to the Internet. The multifunction device 12 and computer 14 can be coupled by a communication channel 18. The communication channel 18 can comprise any suitable connection for the transmission of electronic data and information, such as a hardware connection, an optical connection or a wireless connection. As shown in FIG. 1, the computer 14 can be coupled to a network 16, such as for example the Internet. In alternative embodiments, the system 10 could include such other suitable components for both sending and receiving raster/image data using email transfer mechanisms. It is a feature of the disclosed embodiments to transfer raster/image data via email to email or Internet Fax ("IFAX") clients by using a multifunction device coupled with an email application. Referring to FIGS. 1 and 2, the transferring of raster/image data can generally be accomplished by automatically launching the mail user agent 23 as shown in step 200. The receiving client(s) destination information is transferred step 202 from the multifunction device 12 to the mail user agent 23. The destination information can comprise an email address. The raster/image data can then be transferred in step 204 from the multifunction device 12 to the mail user agent 23. The message, which is described herein as an email message, will then be prepared in step 206 for submission to the Internet. The mail user agent 23 in conjunction with the computer 14 prepares the email message for submission. The email message can then be submitted in step 208 for transmission by an appropriate mail server.

In one embodiment, the step of automatically launching the mail user agent 23 can generally comprise a user activation of a user interface 24 of the multifunction device 12 that captures the intent for sending an email/IFAX. The user interface 24 is adapted to allow user input of the destination information. The destination information input can take the form of an email, intranet or internet address, or telephone number entry, via a combination of keystroke sequences and/or an abbreviated speed/quick dial keystroke entry, which act as reference pointers to email address(es) cached in buffers accessible to the multifunction device 12 or the mail user agent 23. The "destination address" can be any suitable address or destination for delivery of raster/image data, including for example a telephone number, an intra or Internet address, or other network location. The multifunction device 12 is adapted to signal an email/IFAX send request to the mail user agent, whether connected directly or via a network. The multifunction device signaling may be initiated when the user indicates, via the user interface 24, that the destination input has been completed.

The transfer of the destination information can be initiated by receipt of an acknowledgement from the mail user agent 23. The transfer of the destination information can comprise the multifunction device 12 retrieving the email address(es) cached in buffers accessible to the multifunction device 12 and referenced by the abbreviated speed/quick dial sequence. This is followed by the transfer of the retrieved email address(es) to the mail user agent 23. In one embodiment, the transfer of the destination information can occur by transferring the abbreviated speed/quick dial sequence to the mail user agent 23 and then retrieval, by the mail user agent 23 of the email address(es) cached in buffers accessible to the mail user agent 23 and referenced by the abbreviated speed/quick dial sequence. The transfer of destination information can also occur by a transfer of the email address(es), which was entered via a combination of keystroke sequences, to the mail user agent 23.

The transfer of the raster/image data from the multifunction device 12 to the mail user agent 23 generally comprises activating a subsystem of the multifunction device 12, which is adapted to acquire the images. The acquisition of the images can comprise initiating a scan job to acquire the images from the scanner within the multifunction device 12 or a scanner accessible to the multifunction device, or locating images previously stored in buffers accessible to the multifunction device 12. It must be noted that the step of initiating a scan job may also comprise the step of feeding a document into an automatic document feeder.

The captured images can then be encoded with attributes suitable for the receiving client or attributes suitable for transfer of the image to the mail user agent 23. The step of encoding can include, but is not restricted to, compressing and file formatting. The client attributes can in one embodiment have been cached within buffers accessible to the multifunction device 12 or a set of default attributes may be used. The sending to multiple receivers with different attribute requirements may be accommodated by making multi copies of the images, followed by encoding according to the different set of cached attributes. Alternatively, subsequent to the transfer of the encoded images to the mail user agent 23, the mail user agent 23 would recode the image(s) in accordance with client attributes cached within buffers accessible to the mail user agent 23 or in accordance with a default set of attributes. The sending to multiple receivers with different attribute requirements results in the transfer of only one copy of the images across the multifunction device 12/mail user agent 23 interface. The mail user agent 23 will generate the required number of copies in associated encoding prior to transmission.

The preparation of the email message for submission to the Internet would conform to appropriate IETF (Internet Engineering Task Force) Request for Comments (RFC) specifications. This can comprise generation of a mail message by the mail user agent 23, attaching the formatted image(s) within the email message body and constructing the appropriate message headers. In one embodiment, a text message may be added to the body of the mail message. It must be noted that upon receiving such a message, an automatic IFAX receiver may or may not render the text message contained within the message body.

The submission of the message for transmission generally comprises addressing the envelope with Internet address(es) of the receiving client(s) and submitting the address message via an appropriate simple mail transfer protocol ("SMTP") server. In one embodiment, a subject in any appropriate message header type information can be inserted as well.

The multifunction device 12 can include for example, a multifunction peripheral device or xerographic print/copy system. The images, which can also be referred to as documents, are acquired 204 by the multifunction device 12. In one embodiment, the multifunction device 12 can include a scanner that can scan the images. In alternate embodiments, the images can be inputted into the multifunction device 12 in any suitable manner, such as for example, by electronic file transfer. Once acquired, the images and job information also referred to as the "document" can be transferred 206 to the computer 14. The "job information" as referred to herein can include, for example, the destination address, client attributes, file type and size, and any text message or note.

Figure 3:
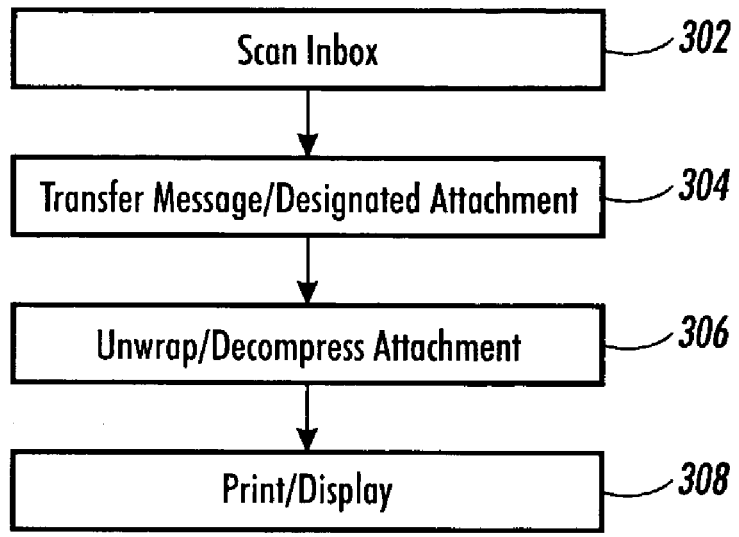
FIG. 3 is a flow chart of one embodiment of a method incorporating features of the disclosed embodiments.

When receiving raster/image data, referring to FIGS. 1 and 3, the inbox of the mail user agent 23 is automatically scanned/polled at predetermined intervals, step 302. The inbox of the mail user agent 23 is scanned for messages that designate raster file attachments. These raster file attachments can include Tag Image File Format ("TIFF") files that are referenced for use in the IFAX standards and are among the most likely designated attachments. However, in alternate embodiments any suitable raster file attachment, such as JPEG or PDF may be designated. The designated attachment(s) may be identified by their file extension(s) and/or Multipurpose Internet Mail Extensions ("MIME") content-type(s). For TIFF files, the file extensions may be one of .tif, .tiff, .tiff-fx or any other suitable extension defined in an appropriate IETF RFC, while the MIME content-types may be one of image/tiff or image/tiff-fx or any other suitable MIME content-type defined in an appropriate IETF RFC. A copy of the designated attachment(s) can be transferred 304 to the multifunction device 12. The file wrapper(s) are unwrapped and the attachments are decompressed 306. Alternatively, file wrapper removal is performed prior to transfer. It is also conceivable that re-coding, to a set of encodings that are more suitable for transfer, will occur prior to the transfer to the multifunction. The transferred attachment, and optionally the message body, can then be processed for printing and/or displaying via the multifunction device 12 printing subsystem or any suitable printer or accessible display. In an alternate embodiment, the attachment can also be received and downloaded in any suitable manner, including for example, an electronic file transfer, for workflow insertion or displaying/printing at an appropriate time.

Figure 4:
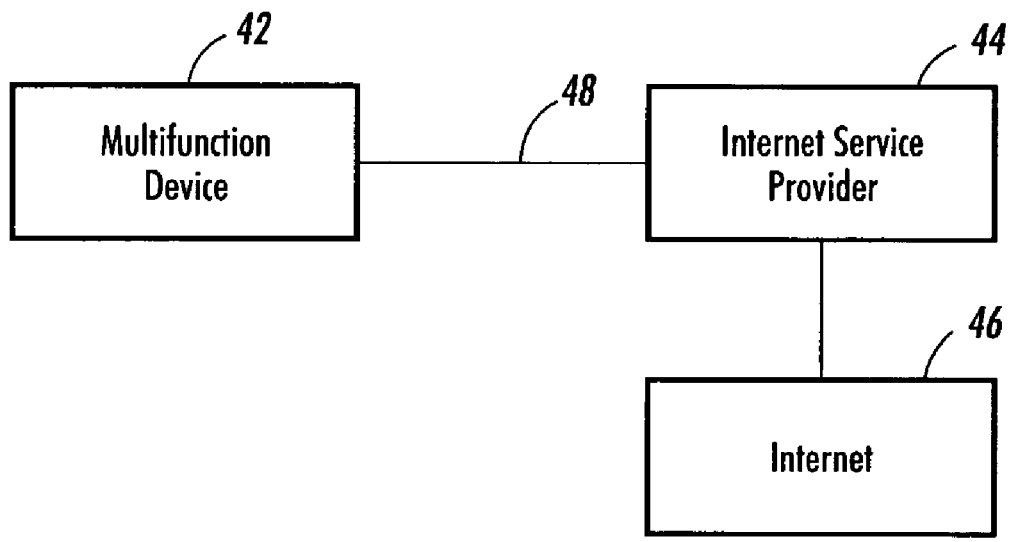
FIG. 4 is a block diagram of one embodiment of a system incorporating features of the disclosed embodiments.

Referring to FIG. 4, in one embodiment, a multifunction device 42 does not need to be connected to a computer to send or receive raster/image data. This embodiment can be referred to as a stand-alone mode. In this mode, the multifunction device 42, similar to device 12 of FIG. 1, is adapted to connect to an Internet service provider or some form of network based service 44. The connection 48 can be established by any suitable means, including, for example, a dial up connection, ISDN connection or DSL connection. Once the connection 48 is established between the multifunction device 42 and the service 44, the raster/image data and destination information can be sent or transmitted as described herein.

In one embodiment, the multifunction device 12 of FIG. 1 can include a button or activation device 26 that is adapted to cause the multifunction device 12 to send or receive raster/image data automatically. The button 26 can comprise a switch located on a control panel of the multifunction device 12 or a "soft button" associated with a software program or application. In an alternate embodiment any suitable switch can be used. By activating the button 26 the user can send an IFAX from the coupled multifunction device 12 or automatically check all unopened received electronic mails for designated files or attachments. A designated file type and any associated email note can be downloaded or reproduced by the multifunction device 12. In one embodiment, the multifunction device 12 comprises a printer or any suitable display/rendering device.

Referring to FIG. 1, activation of some form of an Internet function/button or device 26 can cause the multifunction device 12 to automatically address and send the raster/image data to a designated receiver or prepare a message including raster/image data for manual addressing and sending by the user. Generally, the raster/image data transfer application can be invoked or activated by activating some form of an Internet button or key, or key combination that is defined on the multifunction device. The user can then be prompted to load or transfer the document or image to be sent by the multifunction device. If the document or image is not in an electronic form this can include placing the document in a scanner device that is part of or attached to the multifunction device. Where a scanner is used, the raster/image data can be captured via, for example, a TWAIN™ driver supplied with the multifunction device. The captured image can be encoded with a suitable set of encodings. The encoding method can include the TIFF-FX (IETF RFC 2301 or future replacements there of) S-profile for black/white documents and the TIFF-FX C-profile for color documents. In alternative embodiments, any suitable set of encoding standards or methods can be used.

Activation of the Internet function can also cause the user's electronic mail user agent to open. This can include automatically opening a blank email note. The image can be acquired by the mail user agent from the multifunction device and attached to the email note. This can include acquiring a scanned image from the attached multifunction device scanner using predefined image capture criteria. The scanned image can be encoded appropriately and attached to the blank email note.

In one embodiment the features of the disclosed embodiments could include or be incorporated in a Windows™ based application or software that is adapted to automatically send and receive raster/image data using a multifunction product or device.

Figure 5:
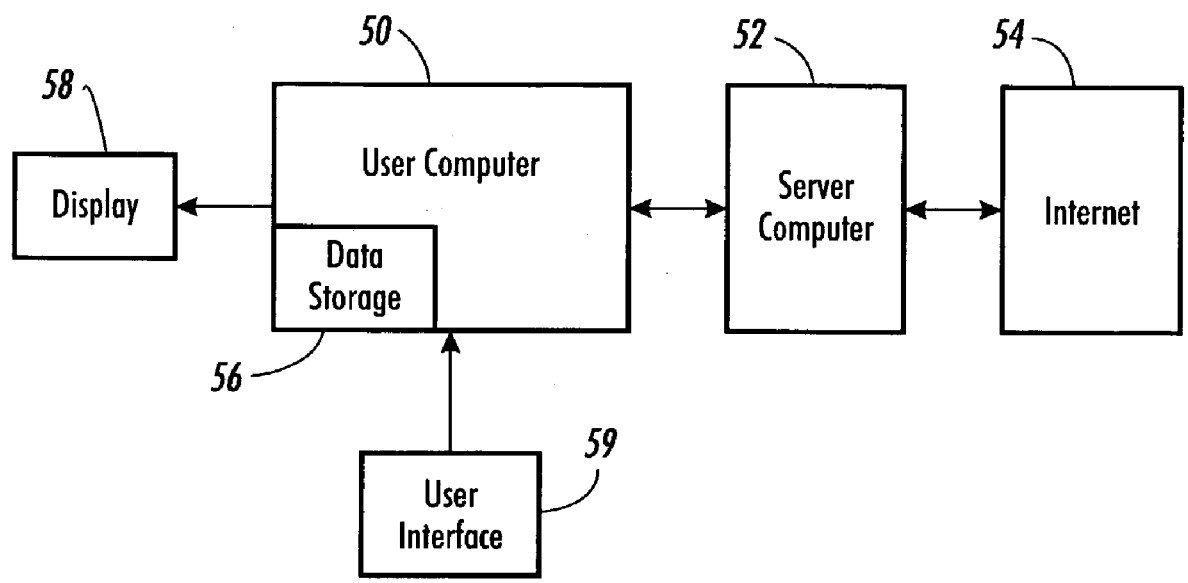
FIG. 5 is a block diagram of an apparatus that may be used to practice the features of the disclosed embodiments.

The present invention may also include software and computer programs incorporating the process steps and instructions described above that are executed in different computers. In the preferred embodiment, the computers are connected to the Internet. FIG. 5 is a block diagram of one embodiment of a typical apparatus incorporating features of the present invention that may be used to practice the present invention. As shown, a computer system 50 may be linked to another computer system 52, such that the computers 50 and 52 are capable of sending information to each other and receiving information from each other. In one embodiment, computer system 52 could include a server computer adapted to communicate with a network 54, such as for example, the Internet. Computer systems 50 and 52 can be linked together in any conventional manner including a modem, hard wire connection, or fiber optic link. Generally, information can be made available to both computer systems 50 and 52 using a communication protocol typically sent over a communication channel or through a dial-up connection on ISDN line. Computers 50 and 52 are generally adapted to utilize program storage devices embodying machine-readable program source code, which is adapted to cause the computers 50 and 52 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 50 and 52 may also include a microprocessor for executing stored programs. Computer 50 may include a data storage device 56 on its program storage device for the storage of information and data. The computer program or software incorporating the processes and method steps incorporating features of the present invention may be stored in one or more computers 50 and 52 on an otherwise conventional program storage device. In one embodiment, computers 50 and 52 may include a user interface 57, and a display interface 58 from which features of the present invention can be accessed. The user interface 59 and the display interface 58 can be adapted to allow the input of queries and commands to the system, as well as present the results of the commands and queries.

The features of the disclosed embodiments generally provide for allowing a user to use a multifunction device, such as for example a xerographic system, to send and receive raster/image data. The disclosed embodiments allow a user to automatically send raster/image data from a multifunction device via a simple and user friendly interface. All received emails can be automatically checked for designated raster/image file attachments and automatically printed/displayed or downloaded as appropriate.

In other alternate embodiments, the mail user agent 23 functionalities as described above may be implemented in some form of network based service 16/54 or an Internet service provider 44.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method of transferring raster/image data via a mail user agent (MUA) using a multifunction device comprising the steps of:
   automatically launching a mail user agent;
   acquiring an image in the multifunction device;
   attaching the image to an electronic mail message generated by the user agent; and
   submitting the image for transmission in the electronic mail message to a receiving address.

2. The method of claim 1 further comprising the steps of:
   polling an electronic mail box by the mail user agent for electronic mail having attachment(s) with predetermined file extension or MIME content-type;
   optionally parsing other email/MIME header or other suitable information to determine if the electronic mail with the predetermined file extension or MIME content-type attachment is an Internet fax (IFax) image;
   transferring the attachment, optionally including the message body, to the multifunction device; and
   automatic printing, displaying and/or downloading to a designated workflow process embedded as subsystems within the multifunction device or accessible via direct or network connections.

3. The method of claim 1 wherein the step of automatically launching the mail user agent comprises:

user activation of a multifunction device user interface, which may include a designated button or soft switch, that captures intent for sending raster/image data via the Internet;

user input of destination information via the user interface; and issuing by the multifunction device of some form of activation signal, to a computer or any other appropriate device containing an appropriately configured mail user agent, which activates the mail user agent.

4. The method of claim 3, wherein the step of user input of destination information comprises input of destination information via the user interface of the multifunction device or the mail user agent, wherein destination information entry at the multifunction user interface is in the form of email/Internet address entered via a combination of key stroke sequences.

5. The method of claim 3, wherein the step of user input of destination information comprises input of destination information via the user interface of the multifunction device or the mail user agent, wherein destination information entry at the multifunction user interface is in the form of email/Internet addresses and/or abbreviated speed/quick dial sequences which reference email/Internet addresses cached in buffers accessible to the multifunction device or the mail user agent.

6. The method of claim 1 wherein the step of acquiring an image further comprises the steps of:

automatically initiating a scan job to acquire the image from an embedded scanner or a scanner accessible to the multifunction device, using predefined image capture criteria; and/or automatically initiating downloading of designated image(s) to the multifunction device via an appropriate file transfer process; and encoding the image per predefined attributes associated with the destination address or image type, or per attributes communicated by the mail user agent.

7. The method of claim 6 wherein the step of encoding may include, but is not restricted to, compressing and file formatting.

8. The method of claim 6 wherein the step of initiate a scan job may comprises the step of feeding a document into an automatic document feeder of the multifunction device and capturing the image with a driver supplied with the multifunction device, or obtained elsewhere as appropriate.

9. The method of claim 1 wherein the step of attaching the image to an electronic mail message further comprises the steps of:

transferring the image and destination address to the mail user agent;

optionally copying and/or re-encoding the image, by the user agent, to accommodate sending to multiple destinations and satisfy attribute profiles cached by the mail user agent or downloaded via network services;

automatically opening a blank electronic mail message in the mail user agent;

automatically attaching the encoded image(s) to the blank electronic mail message.

10. The method of claim 9, wherein the step of transferring destination information comprises:

retrieval, by the multifunction device, of any email address(es) referenced by speed dial/quick dial sequences and cached in buffer accessible to the multifunction device, followed by;

transferring the destination information, including email addresses and/or speed/quick dial sequences, for which email addresses are cached in the mail user agent and will be retrieved following transfer, to the mail user agent.

11. The method of claim 1 wherein the step of submitting the image for transmission further comprises the steps of:

addressing the electronic mail message with Internet address(es) obtained from the multifunction device and/or caches within the mail user agent, which are referenced by speed/quick dial sequences obtained from the multifunction device;

inserting a subject or any other appropriate electronic mail header information; and submitting the message to an appropriate mail server for transmission of the message to the email or IFax recipient(s).

12. The method of claim 1 wherein the mail user agent functionalities as called out may be implemented in some form of network based service or an Internet service provider.

13. A method of receiving raster/image data via a mail user agent using multifunction device comprising:

polling an electronic mail box by the mail user agent for electronic mail having attachment(s) with predetermined file extension or MIME content-type;

optionally parsing other email/MIME header or other suitable information to determine if the electronic mail with the predetermined file extension or MIME content-type attachment is an Internet fax (IFax) image;

transferring the attachment, optionally including the message body, to the multifunction device; and automatic printing, displaying and/or downloading to a designated workflow process embedded as subsystems within the multifunction device or accessible via direct or network connections.

14. The method of claim 13 wherein the step of polling further comprises the step of:

automatically checking each electronic mail in the mail box at a predetermined interval; and examining each unread electronic mail message for attachment(s) of designated file extension or MIME content-type, or any other appropriate header information, which may designate an IFax or email message appropriate for automatic processing.

15. The method of claim 13 wherein the step of transferring further comprising the step of:

extracting the attachment(s) from the mail message;

optionally re-encoding the attachment(s) to a form more suitable for transfer to the multifunction;

transferring the attachment(s), and optionally the associated message body, to the multifunction;

decoding the attachment(s), including but not limited to unwrapping of the file format and decompressing the image(s), in preparation for printing, displaying and/or workflow insertion.

16. The method of claim 13 wherein the mail user agent functionalities as called out may be implemented in some form of network based service or an Internet service provider.

* * * * *